May 12, 1931.  V. R. HUGHES  1,804,418
ROAD SUBGRADING MACHINE
Filed Feb. 13, 1929  2 Sheets-Sheet 1
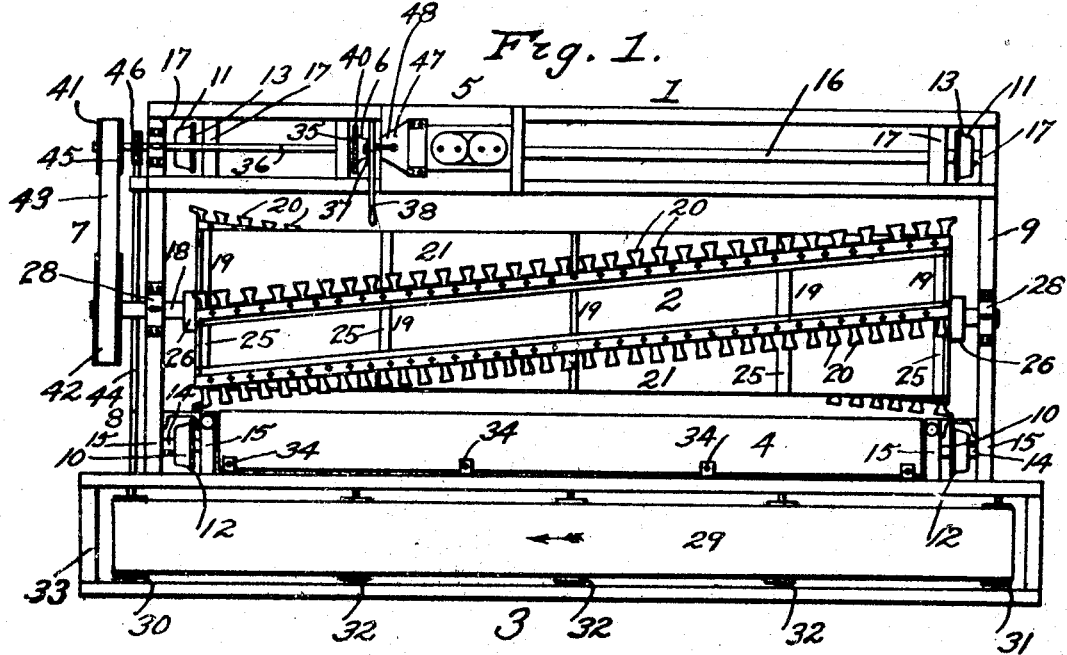
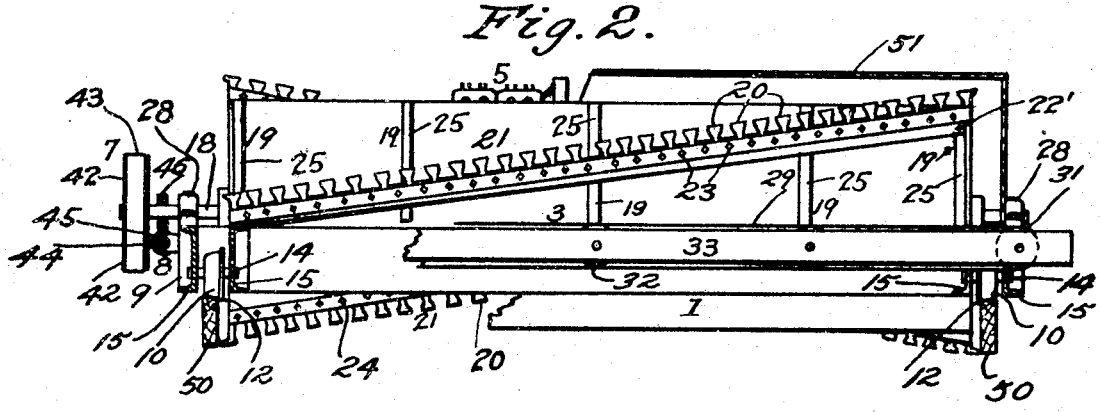
INVENTOR.
VIRGIL R. HUGHES.
BY Alan Franklin
ATTORNEY

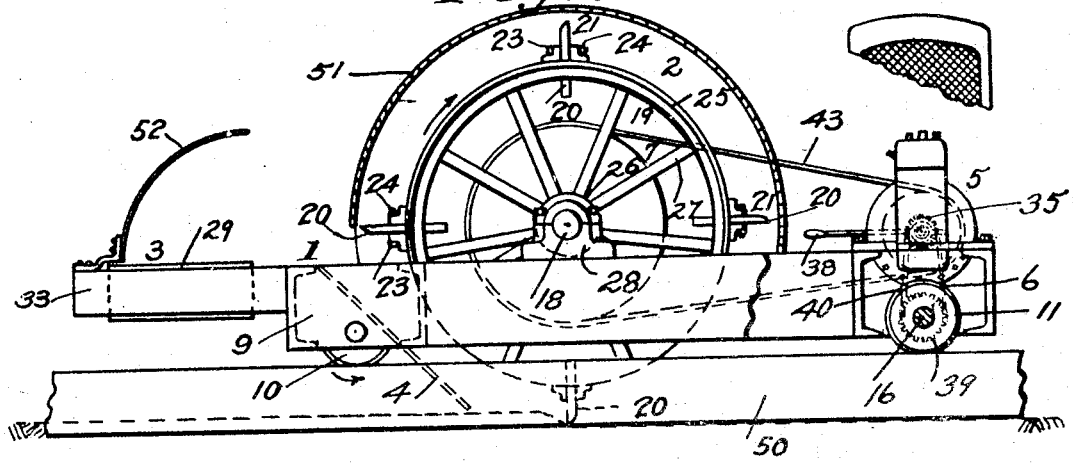
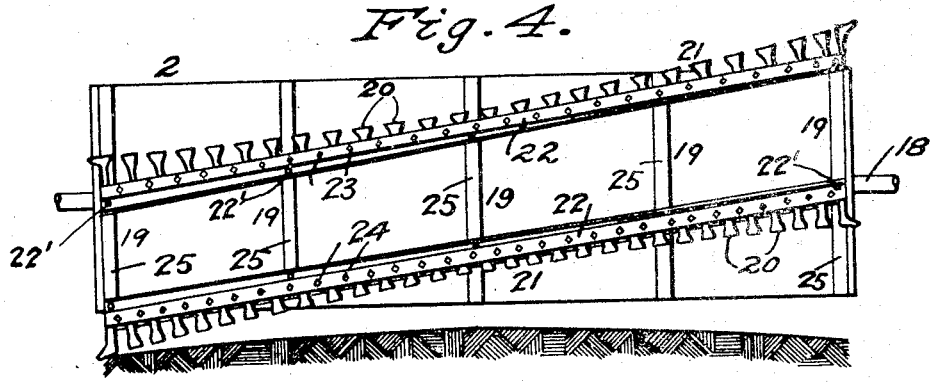
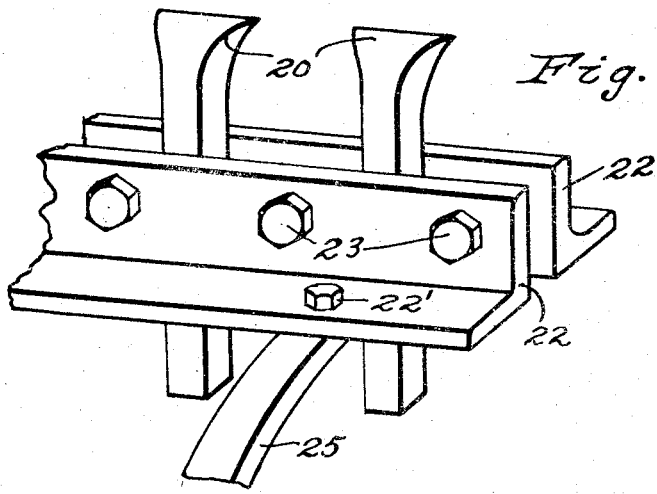

Patented May 12, 1931

1,804,418

UNITED STATES PATENT OFFICE

VIRGIL R. HUGHES, OF BELVEDERE GARDENS, CALIFORNIA

ROAD SUBGRADING MACHINE

Application filed February 13, 1929. Serial No. 339,541.

This invention relates to road grading machinery and more particularly to a road sub-grading machine.

The general object of the invention is to provide a novel machine for sub-grading roads which will be simple in construction and accurate and efficient in operation, and which will effect a great saving in labor and time.

A more particular object is to provide a sub-grading machine which may be adjusted to sub-grade roads of different cross section including flat roads, crown roads of different curvatures and other forms of roads.

A further object is to provide a sub-grading machine for roads which will automatically remove the surplus dirt from the road.

Other objects and advantages will appear hereinafter.

The invention is illustrated in the annexed drawings which form a part of this specification and in which Fig. 1 is a plan view of my invention.

Fig. 2 is a front elevation of my invention, partly broken away and shown in section.

Fig. 3 is an end elevation of my invention partly broken away and shown in section.

Fig. 4 is a side elevation of the sub-grading drum with its dirt cutting teeth shown adjusted and in the act of sub-grading a crown road.

Fig. 5 is a fragmentary perspective view of the adjustable holding means for the cutting teeth of the sub-grading drum.

Corresponding parts are designated by the same reference characters in all the figures.

My invention includes generally a truck 1, a sub-grading drum 2, a dirt conveyor 3, an apron 4 between said drum and said conveyor, a motor 5, which may be a gas engine, driving means 6 whereby said truck is driven by said motor, driving means 7 whereby said sub-grader drum is driven by said motor, and driving means 8 whereby said conveyor is driven by said motor.

The truck 1 comprises a frame 9, which may be formed of channel iron, front wheels 10, and rear wheels 11, on which wheels said frame is mounted. The wheels 10 are formed with external annular flanges 12 at their inner edges and the wheels 11 are formed with external annular flanges 13 at their inner edges. The front wheels 10 are secured on short shafts 14 which are suitably journaled in bearings 15 on the forward end of the truck frame 9. The rear wheels 11 are secured on a shaft 16 extending transversely of the rear of the truck frame 9 and journaled in bearings 17 in said frame.

The sub-grading drum 2 comprises a shaft 18, a plurality of circular drum frames 19 secured centrally in spaced relation on said shaft, and a plurality of grading teeth 20 arranged in rows 21 extending lengthwise of the drum at an angle to the axis of the drum, each row of teeth being clamped between a pair of angle irons 22 by bolts 23 and nuts 24, which angle irons are secured by bolts 22' to the exterior of the rims 25 of the drum frames 19, and extend lengthwise of the drum at an angle to the axis thereof. Each of the drum frame members 19 comprises a rim 25, a hub 26, and spokes 27 connecting to said hub and rim, the hubs of the frame members being secured on the drum shaft 18. The drum shaft 18 extends transversely of the truck and is journaled at its ends in bearings 28 on the side members of the truck frame. The teeth 20 extend preferably radially from the center of the drum 2 and may be adjusted to extend outwardly from the drum at different lengths, upon loosening the nuts 24, and secured in such adjusted positions upon tightening said nuts, whereby the teeth 20 are adjusted for sub-grading flat roads, crown roads of varying curvatures and roads of other cross section.

The dirt conveyor 3 may comprise an endless belt 29 extending across the front end of the truck 1 over end rollers 30 and 31 and idler rollers 32, which rollers are suitably journaled in a front frame member 33 of the truck frame 1.

The apron 4 is hinged at its forward edge to the rear beam of the front frame member 33, by hinges 34, and hangs down at an angle with its rear edge trailing on the ground.

The truck driving means 6 comprises a sprocket 35 loosely mounted on the motor shaft 36, a clutch 37 for clutching said sprocket to said shaft, a clutch operating lever 38, a sprocket 39 secured on the rear wheel shaft 16 of the truck 1 and a chain 40 extending over the sprockets 35 and 39.

The drum driving means 7 comprises a pulley 41 secured on the motor shaft 36, a pulley 42 secured on the drum shaft 18 and a belt 43 extending over said pulleys.

The conveyor driving means 8 comprises the shaft 44 on which the conveyor roller 30 is secured, and intermeshing worms 45 and 46 on said shaft and the motor shaft 36 respectively.

The motor 5 may be constructed with shiftable driving gears as indicated at 47 and a gear shift lever 48 such as found in automobile engines, whereby the engine shaft 36 may be driven at different speeds or disconnected from the engine and not driven at all as conditions require.

The operation of my invention is as follows:

When a road is first roughly graded and the header boards 50 placed in position in the road, my machine is placed over the road with the truck wheels 10 and 11 resting upon said header boards and the flanges 12 and 13 of said wheels engaging the inner faces of said header boards. The motor 5 being started, the gears 47 being shifted into mesh by the lever 48 and the clutch 37 shifted into operative position by the lever 38, the truck wheels 11 are rotated through the medium of sprockets 35 and 39 and chain 40, whereupon the machine travels forwardly over the road with the wheels 10 and 11 traveling along the header boards 48, while the drum 2 is rotated in a direction opposite to that of said wheels, through the medium of shaft 36, pulleys 41 and 42 and belt 43, and the conveyor belt 29 is caused to travel in a direction transversely of the machine, through the medium of shaft 36, worms 45 and 46 and shaft 44. The rotation of the drum 2 causes the teeth 20 to cut the dirt in the road bed and throw the dirt forwardly and upwardly over the apron 4 which directs the dirt onto the conveyor belt 29, whereby the road bed is sub-graded to the desired cross section. The conveyor conveys and delivers the dirt over one of the header boards 50 to one side of the road, thus removing the dirt from the road. The drum 2 may be covered by a hood 51. A hood 52 covers the forward side and upper portion of the conveyor 3.

I do not limit my invention to the exact construction herein disclosed because many changes and modifications may be made therein, without departing from the spirit of the invention.

I claim as my invention:

1. A road sub-grading machine comprising a truck with wheels arranged to travel on the header boards of a roughly graded road, a motor mounted on said truck, a drum extending transversely of and journaled on said truck, cutting teeth on said drum, means to enable said motor to drive the wheels of said truck to cause the truck to travel forwardly on said header boards, means to enable said motor to rotate said drum in the reverse direction to the rotation of the truck wheels, so that the dirt cut by the drum teeth will be thrown forwardly of the truck from the road bed and a conveyor on the truck for receiving said cut dirt and conveying the same to one side of the road, and an apron on the truck extending between the lower part of said drum to said conveyor for directing the dirt cut by the drum teeth to the conveyor.

2. A road sub-grading machine comprising a truck with wheels arranged to travel on the header boards of a roughly graded road, a motor mounted on said truck, a drum extending transversely of and journaled on said truck, cutting teeth on said drum, means to enable said motor to drive the wheels of said truck to cause the truck to travel forwardly on said header boards, means to enable said motor to rotate said drum in the reverse direction to the rotation of the truck wheels, so that the dirt cut by the drum teeth will be thrown forwardly of the truck from the road bed and a conveyor on the truck for receiving said cut dirt and conveying the same to one side of the road, and an apron on the truck extending between the lower part of said drum to said conveyor for directing the dirt, cut by the drum teeth, to the conveyor, said apron being hinged at its forward upper edge to the truck with its lower edge trailing on the ground immediately forward of the cutting teeth of the drum.

VIRGIL R. HUGHES.